Oct. 18, 1949.  A. A. ACKERMAN  2,485,345
REFLECTING TELESCOPIC OBJECTIVE
OF THE CASSEGRAINIAN TYPE
Filed May 16, 1946

INVENTOR,
Abe A. Ackerman,
by Frank S. Ackerman
ATTORNEY.

Patented Oct. 18, 1949

2,485,345

UNITED STATES PATENT OFFICE 2,485,345

REFLECTING TELESCOPIC OBJECTIVE OF THE CASSEGRAINIAN TYPE

Abe A. Ackerman, Freeland, Pa.

Application May 16, 1946, Serial No. 670,255

7 Claims. (Cl. 88—57)

This invention relates to improvements in objectives for telescopes, and has more particular relation to telescopes of the Cassegrainian type.

Telescopes of this type are of the reflecting type, in which the object mirror is concave while the secondary mirror is of convex curvature, the focal length and curvatures being so arranged as to cause the reflected rays to issue through a small aperture at the axis of the object mirror, passing onward to a suitable eye-piece through which the image is viewed. Due to the convex curvature of the secondary mirror, the image is inverted, distinguishing in this respect from the Gregorian type in which the secondary mirror has a concave curvature and provides the image in its erect position. The Cassegrainian secondary mirror is positioned closer to the object mirror than is the Gregorian secondary mirror, but in both cases the curvatures of the mirrors relative to each other are such as to provide for directing the reflected rays toward the central opening of the object mirror. In the Gregorian type the secondary mirror is spaced a greater distance from the object mirror than the focal length, while in the Cassegrainian type the spacing distance is less than the focal length.

The present invention is designed to produce the same general effects as are present in the Cassegrainian type, but to do this, with a greatly reduced spacing between the mirrors without, however, reducing the focal length characteristic that is present in this type. The physical distance between the two mirrors is reduced to such an extent that the two mirror faces are carried by a single structure in the form of a lens having a particular configuration and in which the ray emission zone may be of particular formation to aid in collecting the rays for eye-piece activity, with the result that practically the entire objective other than the eye-piece may be found within the lens of the present invention, thus providing for a compact objective capable of efficiently performing the services of this type of telescope.

To these and other ends, therefore, the nature of which will be more clearly understood as the invention is hereinafter disclosed, said invention consists in the improved construction and combination of parts hereinafter more fully described, illustrated in the accompanying drawings, and more particularly pointed out in the appended claims.

Figure 1:
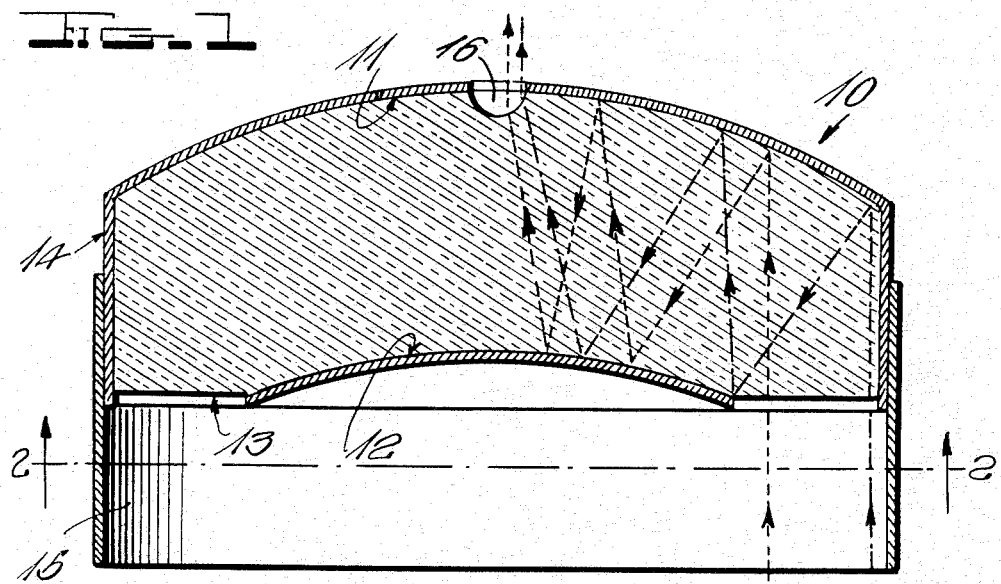
Figure 2:
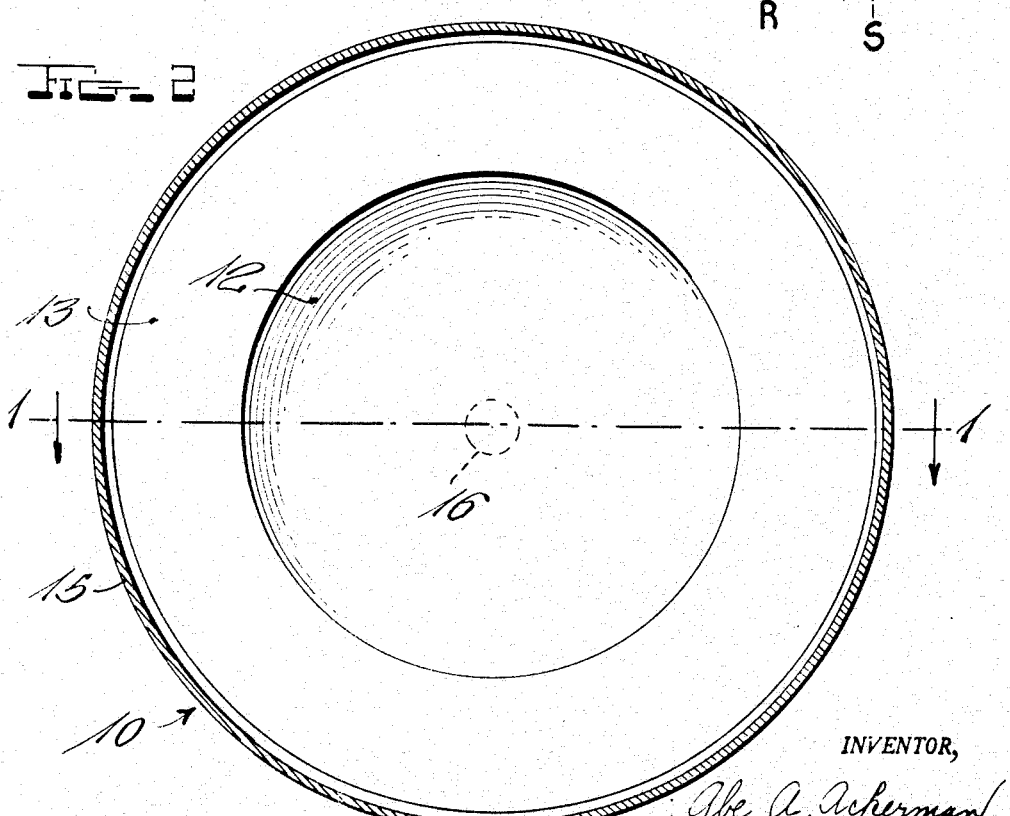

In the accompanying drawings, in which similar reference characters indicate similar parts in each of the views, Figure 1 is a longitudinal sectional view taken on the line 1—1 of Fig. 2, the view illustrating characteristics of the objective zone of a telescope of this type; and Figure 2 is a section taken on the line 2—2 of Fig. 1.

The lens, which forms the foundation of the present invention and indicated generally at 10, is of solid glass, and is of meniscus form, having its opposite faces of spherical curvature, with the side of circular contour. The curved face 11 which is a convex face of the lens, has its arc of curvature extending entirely across the width of the lens—with the exception of a central configuration, presently referred to—so that said face when properly treated with the mirror producing material will present the concave object mirror effect desired in the objective. The opposite curved face 12 which is a concave face of the lens, is of less arcuate length than face 11, but is symmetrically disposed relative to face 11, face 12 having an annular plane surface configuration which is located in the peripheral zone of this face of the lens beyond the curved face 12, such plane face being indicated at 13. Face 12 is also treated to produce the mirror effect, and constitutes this portion of the completed face as the secondary mirror of the objective. The circular side of the lens is surrounded by an annular rim 14, and a shell 15 serves to protect such lens.

The central zone of face 11 is provided with a depression 16, this depression serving the function of the central opening found in the object mirror of the Cassegraine form of telescope. In practice it is preferred that the depression 16 has its wall of a more or less definite curvature.

The rays of light from the object being viewed enter the lens through the plane face 13, passing to the reflecting surface of face 11, from which they are reflected back through the lens onto the reflecting face 12, which, in turn, again reflects them onto the reflecting surface of face 11, again reflected to face 12, from which they are reflected to the wall of the depression 16, through which wall the rays emerge and pass in the general direction of the axis of the lens to the eye-piece. As a result, each ray is reflected—in the illustrated form—four times in passing from face 13 to the wall of depression 16. The distance traveled by the ray in traversing the lens becomes the major portion of the focal length of the objective, conforming in this respect to the length distance presented in the Cassegraine objective.

As will be understood, face 12 is not concentric with face 11; in the particular form shown, and which is designed to be illustrative only, the faces 11 and 12 may be of similar radius length, the center of curvature of each being located on a line extending in the axis of the lens, this arrangement being desirable with a lens having the thickness shown, and in this form the area of the face 13 is approximately equal to the area of face 12.

For the purpose of illustrating the action of the lens, two rays are shown, indicated respectively at R and S, these rays entering the lens in the annular planar face zone which is located on the same side of the lens as the secondary mirror formation, but is not provided with the mirror face, the rays thus traversing the peripheral zone of the lens before reaching the object mirror face; they are reflected back through the lens in accordance with the curvature of the object mirror face, the reflected rays reaching the area of the secondary mirror which is of convex form, and being itself a mirror face, again reflects the rays through the lens onto the object mirror face at some distance from the depression 16, thus being within the mirror zone and therefore again reflected through the lens onto the secondary mirror which then reflects the rays to the wall of depression 16. As a result, each ray traverses the lens five times in passing from the planar face 13 to the wall of depression 16. As will be understood, the particular curvatures of the faces together with the thickness of the lens, are so arranged that each ray will be given the same number of reflections and will reach the wall of the depression properly related to adjacent rays, although the rays enter the objective in the form of an annular arrangement with the inner limit of the annulus provided by the periphery of the secondary mirror, as in the Cassegraine type; due to the conditions referred to, however, the emerging rays tend to produce a pencil effect through the depression, the curvature of the walls of the latter being such as to tend to direct the rays in the general direction of the axis of the lens and toward the eye-piece (not shown); in practice, it is possible that the pencil of rays emanating from the depression zone, will also be somewhat annular in form, but the relatively small size of the pencil as compared with that of the annular planar face, the cross-sectional area will be so reduced that there is little difficulty in the proper collection of the rays by the eye of the observer, or an eyepiece, if used, so that a clear image effect is obtained. One of the characteristics produced by this multi-reflection action is that, unlike the Cassegraine effect, the rays do not appear in inverted arrangement, this being understood by noting the developments of rays R and S, ray R being shown as of dash formation while ray S is shown as of the dot-and-dash arrangement.

As will be understood, the objective is compact, due to the comparatively small thickness of the lens, a condition which does not materially affect the focal length of the objective, due to the internal multi-reflections within the lens; hence, the distance between the opposing mirror faces is relatively very short, as compared with objectives used in this type of telescope, and since there is but a relatively small width of objective surface exposed, distortion aberrations are of a low order. Inasmuch as the reflecting surfaces will reflect all wave lengths equally, it is apparent that if the curvature of the wall of depression 16 is so designed that emergent rays of light are undeviated, no chromatic aberration will be present for axial objects. And if the curvature of the walls of depression 16 is such as to deviate pencils of light so that the rays within the pencils will be parallel to each other, a telescopic principle is established requiring no separate eye-piece or only a modified form, and the entire system will then be contained within one piece of glass.

The diameter of the lens, its thickness, the curvatures of surfaces 11 and 12, the size of the planar area 13 and the size of the depression 16 are all predetermined to cause the light which enters at the planar face to leave the depression 16 free of distortions and in such a manner that telescopic magnification may be produced through either grinding a suitable curve for the wall of the depression or by placing a lens or lenses beyond the depression.

The thickness of the lens is so calculated as to conform with a system of optics so that magnification of at least $1.5x$ can be obtained.

While the drawings and the description thus given indicates that a ray is reflected four times within the objective, this number of reflections is deemed a minimum number, and can be exceeded in practice, should the conditions warrant. For instance, with a lens of very large diameter, it might be possible that to produce the four ray reflections referred to, the thickness of the lens would be rather large. In such cases, it would be possible to decrease the thickness by providing the spherical surfaces of proper curvature such as would provide for an increased number of reflections of the ray within the lens; in such case, it will be understood that the diameter of the secondary mirror will be such as to insure that all rays entering through face 13 will be reflected onto face 12, a condition which may require an increase in the diameter of face 12 as compared with that shown.

As will be understood, the lens, which is of solid glass, and of meniscus form, is ground and polished, this applying to each of the faces 11, 12 and 13, the specific dimensions and curvatures being preliminarily developed through calculations designed to set up the particular characteristics which form the underlying features of the present invention.

While I have herein shown and described a particular form of the invention, it will be understood that changes or modifications therein may be found desirable or essential in meeting the various exigencies of service conditions, and I hereby reserve the right to make any and all such changes or modifications as may be found desirable or essential insofar as the same may be found within the spirit and scope of the invention as expressed in the accompanying claims, when broadly construed.

I claim:

1. In a telescopic objective system, wherein the object mirror is of concave curvature and the secondary mirror is of convex curvature with the mirrors in spaced relation less than the focal length of the objective and with the mirrors in axial alinement to provide an objective for the telescope with the light rays reaching the telescope eye-piece through an axial zone of the object mirror, an objective for telescopes of this type comprising a glass lens formation of the meniscus type and of circular contour, the convex face of the lens being generally of spherical curvature with the latter having dimensions to reach the circular side wall of the lens, the opposite concave face of the lens having an annular planar facial zone surrounding a concave zone of spherical curvature and of less area than the convex face, said opposing spherical faces being symmetrically disposed and axially alined, said spherical faces being provided with a facing active to constitute the face as a mirror, an axial zone of the convex face being free of such facing, to thereby present the convex face of the lens as the concave object mirror and the concave face of the lens constituting the convex secondary mirror of the objective, the opposing spherical faces having their centres of curvature non-coincidental, the thickness of the lens and the relative dimensions of the spherical faces being such as to provide at least four reflections in series of a light ray entering the objective through the planar face and emerging through the object mirror axial zone.

2. An objective as in claim 1 characterized in that the area of the secondary mirror spherical face is such as to receive the reflections from the spherical face of the object mirror of all of the light rays entering the lens through the annular planar face and wherein the area of the planar facial zone is approximately equal to the area of the secondary mirror face.

3. An objective as in claim 1 characterized in that the un-faced axial zone of the object-mirror is in the form of a depression the wall of which includes a zone of curvature through which the reflected light rays emerge to thereby present characteristics of the telescope eye-piece formation.

4. An objective as in claim 1 characterized in that the arcs of spherical curvatures of the opposite faces of the lens have their centres of curvature on a line extending through and corresponding with the axis of the lens.

5. An objective as in claim 1 characterized in that the arcs of spherical curvatures of the opposite faces of the lens have their centres of curvature on a line extending through and corresponding with the axis of the lens, and with the radii of arc curvature of substantially similar lengths.

6. An objective for telescopes comprising a lens formation of the meniscus type, with opposite faces thereof symmetrical to the lens axis formed as mirror faces to constitute one face as the object mirror and the opposite face as the secondary mirror, the latter face including an annular planar zone surrounding the secondary mirror face and having an area approximately equal to the area of the secondary mirror face, the object mirror including an axial zone of non-mirror characteristic, the thickness of the lens and the relative dimensions of the faces thereof being such as to provide at least four reflections in series of a light ray entering the objective through the annular planar zone and emerging through the axial zone of non-mirror characteristic.

7. An objective for telescopes comprising a lens formation of the meniscus type, with opposite faces thereof symmetrical to the lens axis formed as mirror faces to constitute one face as the object mirror and the opposite face as the secondary mirror, the latter face including an annular planar zone surrounding the secondary mirror face and having an area approximately equal to the area of the secondary mirror face, the object mirror including an axial zone of non-mirror characteristic, said axial zone being in the form of a depression having its wall including a zone of curvature, the thickness of the lens and the relative dimensions of the faces thereof being such as to provide at least four reflections in series of a light ray entering the objective through the annular planar zone and emerging through said depression.

ABE A. ACKERMAN.

REFERENCES CITED

The following references are of record in the file of this patent:

UNITED STATES PATENTS

| Number | Name | Date |
| --- | --- | --- |
| 874,049 | Borsch | Dec. 17, 1907 |
| 929,795 | Siedentopf | Aug. 3, 1909 |
| 1,016,369 | Siedentopf | Feb. 6, 1912 |
| 1,578,899 | Lohmann | Mar. 30, 1926 |
| 2,336,379 | Warmisham | Dec. 7, 1943 |
| 2,380,887 | Warmisham | July 31, 1945 |

FOREIGN PATENTS

| Number | Country | Date |
| --- | --- | --- |
| 410,263 | France | Mar. 10, 1910 |